United States Patent
Baecker et al.

(10) Patent No.: US 7,318,045 B2
(45) Date of Patent: Jan. 8, 2008

(54) EVENT-DRIVEN TRADE LINK BETWEEN TRADING AND CLEARING SYSTEMS

(75) Inventors: Thomas Baecker, Königstein (DE); Joerg Buddendiek, Bad Homburg (DE); Kevin Carnahan, Bad Homburg (DE); Ralph Egert, Eltville (DE); Patrick C. Feder, San Francisco, CA (US); Carsten Frank, Ratingen (DE); Tanya F. Nargolwalla, Schwalbach (DE); Robert R. Zahm, Kronberg (DE)

(73) Assignees: Accenture LLP, San Jose, CA (US); Accenture Global Services GmbH (CH); Deutsche Börse AG, Frankfurt (DE)

( * ) Notice: Subject to any disclaimer, the term of this patent is extended or adjusted under 35 U.S.C. 154(b) by 997 days.

(21) Appl. No.: 09/793,437

(22) Filed: Feb. 26, 2001

(65) Prior Publication Data

US 2001/0049649 A1 Dec. 6, 2001

Related U.S. Application Data

(60) Provisional application No. 60/186,082, filed on Feb. 29, 2000.

(51) Int. Cl.
G06Q 30/00 (2006.01)
(52) U.S. Cl. ............................ 705/37; 705/35; 705/36; 705/38; 705/80
(58) Field of Classification Search .................. 705/37, 705/35, 36, 38, 80
See application file for complete search history.

(56) References Cited

U.S. PATENT DOCUMENTS 5,916,307 A * 6/1999 Piskiel et al. ............... 719/314
6,014,643 A * 1/2000 Minton ...................... 705/36 R
6,247,000 B1 * 6/2001 Hawkins et al. ............... 705/37
6,421,653 B1 * 7/2002 May .......................... 705/36 R
6,618,707 B1 * 9/2003 Gary ........................... 705/37
6,629,082 B1 * 9/2003 Hambrecht et al. ........ 705/36 R
2003/0050888 A1 * 3/2003 Satow et al. ................... 705/37

* cited by examiner

Primary Examiner—Nga Nguyen
(74) Attorney, Agent, or Firm—Brinks Hofer Gilson & Lione

(57) ABSTRACT

A system is provided for linking together a system of trading financial instruments to a system of clearing transactions in financial instruments. In a first aspect of the present invention, the linking system includes a network linking a plurality of trading systems and a clearing system. An external interface couples the trading systems to the network while a clearing interface couples the clearing system to the network. A transmitter module transmits trading information in a plurality of kinds of securities along the network from the trading system to the clearing system. That transmitting selectively occurs approximately simultaneously with the arrival of the trading information at the external interface. The transmitting also occurs independently of the selection of trading algorithm or clearing algorithm. A second aspect of the present invention involves a computerized method for coupling a plurality of trading systems and a clearing system with a network. The method couples the trading systems to the network at an external interface and the clearing system to the network at a clearing interface. Transmission of trading information occurs along the network from the trading system to the clearing system. That transmission selectively occurs approximately simultaneously with the arrival of the trading information at the external interface. The trading information covers trades in a plurality of kinds of financial instruments, including, stocks, bonds, commodities, goods, services, and rights. The transmitting of trading information in the computerized method occurs independently of the selection of trading algorithm or clearing algorithm.

19 Claims, 6 Drawing Sheets

EVENT-DRIVEN TRADE LINK BETWEEN TRADING AND CLEARING SYSTEMS

The application claims benefit of Provisional Application 60/186,082, filed Feb. 29, 2000.

FIELD OF THE INVENTION

The present invention relates to a linking system coupling one or more securities trading systems to a clearing system. More particularly, the linking is event-driven, with the information rapidly transferred along the network as information becomes available.

BACKGROUND OF THE INVENTION

Securities in scope and in trading mechanics have enormous breadth. In scope, securities naturally include conventional stocks and bonds but have the far more expansive notion today of virtually any financial instrument. For example securities will include futures on tangible commodities such as agricultural products. But futures themselves today will cover a wide range of tangible and intangible items ranging from interest rates to stocks to stock indices to foreign currencies and to pollution rights. Securities may also include so-called "derivatives" other than futures, e.g. options in all their varieties. We define a financial instrument as an instrument that may be bought or sold for money on an exchange, regardless of the underlying security, commodity, good or service. An exchange is any place where a market is made for such instrument an instrument.

The mechanics of trading are also enormously complex. Trades may be made in formal exchanges, if "listed" or, if "unlisted" over a network commonly known as the "Over-the-Counter" ("OTC") market. In the case of formal exchanges and for some networks, an important role in trading mechanics is played by a "clearinghouse" or, synonymously in this disclosure, a "clearing system." Depending upon the exchange and the type of security, the exact role of the clearing system will vary.

Most stocks are sold the "regular way," which requires delivery of certificates within three business days. It would be extremely inefficient if every security transaction had to end with a physical transfer of stock certificates from the seller to the buyer. A brokerage firm might sell on the New York Stock Exchange 100 shares of IBM stock for one client, Mr. X, and later that day buy 100 shares for Ms. Y, another client. Mr. X's 100 shares could be delivered to his buyer, and Ms. Y's shares could be obtained by accepting delivery from her seller. However, it would be much easier to transfer Mr. X's shares to Ms. Y and instruct Ms. Y's seller to deliver 100 shares directly to Mr. X's buyer. This route would be especially helpful if the brokerage firm's clients, Mr. X and Ms. Y, held their securities in street name. Then the 100 shares would not have to be moved and their ownership would no have to be changed on the books of IBM.

The process can be facilitated even more by a clearing system, the members of which are brokerage firms, banks, and other financial institutions. Records of transactions made by members during the day are sent there shortly afterward. At the end of the day, both sides of the trades are verified for consistency, and then all transactions are netted out. Each member receives a list of the net amounts of securities to be delivered or received along with the net amount of money to be paid or collected. Every day each member settles with the clearinghouse instead of with various other firms.

By holding securities in street name and using clearing systems, brokers can reduce the cost of transfer operations. But even more can be done: certificates can be immobilized almost completely. The Depository Trust Company ("DTC") immobilizes certificates by maintaining computerized records of the securities "owned" by member firms (brokers, banks, and so on). Members' stock certificates are credited to their accounts at the DTC, while the certificates are transferred to the DTC on the books of the issuing corporation and remain registered in its name unless a member subsequently withdraws them. Whenever possible, one member will "deliver" securities to another by initiating a simple bookkeeping entry in which one account is credited and the other is debited for the shares involved.

Trading in futures contracts is more complex than making ordinary stock transactions. If an investor wants to make a stock purchase, his broker simply acts as an intermediary to enable the investor to buy shares from or sell to another individual through the stock exchange. In futures trading, however, the clearinghouse plays a more active role.

When an investor contacts a broker to establish a futures position, the brokerage wires the order to the firm's trader on the floor of the futures exchange. In contrast to stock trading, which involves specialists or market makers in each security, most futures trades in the United States occur among floor traders in the "trading pit" for each contract. Once a trader willing to accept the opposite side of a trade is located, the trade is recorded and the investor is notified.

At this point, the clearing system enters the picture. Rather than having the long and short traders hold contracts with each other, the clearinghouse becomes the seller of the contract for the long position and the buyer of the contract for the short position. The clearing system is obligated to deliver the commodity to the long position and to pay for delivery from the short; consequently, the clearinghouse's position nets to zero. This arrangement makes the clearing system the trading partner of each trader, both long and short. The clearinghouse, bound to perform on its side of each contract, is the only party that can be hurt by the failure of any trader to observe the obligations of the futures contract. This arrangement is necessary because a futures contract calls for future performance, which cannot be as easily guaranteed as an immediate stock transaction.

FIGS. 1 and 2 illustrate the role of the clearing system in a futures transaction. FIG. 1 shows what would happen in the absence of the clearinghouse. The trader in the long position 101 would be obligated to pay the futures price 105 to the short position trader 111, and the trader in the short position 111 would be obligated to deliver the instrument or security or commodity 115. FIG. 2 shows how the clearing system 121 becomes an intermediary, acting as the trading partner for each side of the contract. The clearinghouse's position is neutral, as it takes a long 125 and a short position 131 for each transaction.

The clearing system makes it possible for traders to liquidate positions easily. If an investor is currently long in a contract and wants to undo his or her position, the investor simply instructs the broker to enter the short side of a contract to close out his or her position. This is called a reversing trade. The exchange nets out the investor's long and short positions, reducing his or her net position to zero. The zero net position with the clearinghouse eliminates the need to fulfill at maturity either the original long or reversing short position.

The open interest on the contract is the number of contracts outstanding. (Long and short positions are not counted separately, meaning that open interest can be defined as either the number of long or short contracts outstanding.) The clearing system's position nets out to zero, and so is not counted in the computation of open interest. When contracts begin trading, open interest is zero. As time passes, open interest increases as progressively more contracts are entered. Almost all traders, however, liquidate positions before the contract maturity date.

Instead of actually taking or making delivery of the commodity, market participants virtually all enter the reversing trades discussed above to cancel their original positions, thereby realizing the profits or losses on the contract. The fraction of contracts that result in actual delivery is estimated to range from less than 1% to 3%, depending on the commodity and the activity in the contract.

In a typical pattern of open interest, for example, in November the December delivery contract is close to maturity, and open interest is relatively small; most contracts have been reversed already. The next few maturities have significant open interest. Finally, the most distant maturity contracts have little open interest, as they have been available only recently, and few participants have traded. For other contracts, where January or February is the nearest maturity, open interest is typically highest in the nearest contract.

In fact, traders simply bet on the futures price of the underlying commodity. The total profit or loss realized by the long trader who buys a contract at time 0 and closes, or reverses, it at time t is just the change in the futures price over the period, $F_t - F_0$. Symmetrically, the short trader earns $F_0 - F_t$.

The process by which profits or losses accrue to traders is called marking to market. At initial execution of a trade, each trader establishes a margin account containing "initial" or "performance" margin. The margin is a security account consisting of cash or near-cash securities, such as Treasury bills, which ensures the trader is able to satisfy the obligations of the futures contract. Because both parties to a futures contract are exposed to losses, both must post margin. One example is a contract for corn for $1138.75 ($2.2775 per bushel×5,000 bushels per contract). If the initial margin on corn, for example, is 10%, then the trader must post $1,138.75 per contract for the margin account. Because posting interest-earning securities may satisfy the initial margin, the requirement does not impose a significant opportunity cost of funds on the trader. The initial margin is usually set between 5% and 15% of the total value of the contract. Contracts written on assets with more volatile prices require higher margins.

On any day that futures contracts trade, futures prices may rise or may fall. Instead of waiting until the maturity date for traders to realize all gains and losses, the clearinghouse requires all positions to recognize profits as they accrue daily. If the futures price of corn rises, the clearing system credits the margin account of the long position for the amount of the rise. Conversely, for the short position, the clearinghouse takes this amount from the margin account for each contract held. This daily settling is called marking to market. It means the maturity date of the contract does not govern realization of profit or loss. Marking to market ensures that, as futures prices change, the proceeds accrue to the trader's margin account immediately.

If a trader accrues sustained losses from daily marking to market, the margin account may fall below a critical value called the maintenance, or variation, margin. Once the value of the account falls below this value, the trader receives a margin call. For example, if the maintenance margin on corn is 5%, then the margin call will go out when the 10% margin initially posted has fallen about in half, to $569 per contract. Either new funds must be transferred into the margin account, or the broker will close out enough of the trader's position to meet the required margin for that position. This procedure safeguards the position of the clearing system. Positions are closed out before the margin account is exhausted; the trader's losses are covered, and the clearinghouse is not affected.

It is important to note that the futures price on the delivery date will equal the spot price of the commodity on that date. As a maturing contract calls for immediate delivery, the futures price on that day equals the spot price-the cost of the commodity from the two competing sources is equalized in a competitive market. The investor may obtain delivery of the commodity either by purchasing it directly, in the spot market or by entering the long side of a futures contract. This is called the convergence property.

For an investor who establishes a long position in a contract at time 0 and holds that position until maturity (time T), the sum of all daily settlements will equal $F_T - F_0$, where $F_T$ stands for the futures price at contract maturity. Because of convergence, however, the futures price at maturity, $F_T$, equals the spot price, $P_T$, so total futures profits also may be expressed as $P_T - F_0$. Thus, profits on a futures contract held to maturity track changes in the value of the underlying asset.

Most futures markets call for delivery of an actual commodity such as a particular grade of wheat or a specified amount of foreign currency if the contract is not reversed before maturity. For agricultural commodities, where quality of the delivered good may vary, the clearing system or exchange sets quality standards as part of the futures contract. In some cases, contracts may be settled with higher—or lower—grade commodities. In these cases, a premium or discount is applied to the delivered commodity to adjust for the quality difference.

Some futures contracts call for cash delivery. An example is a stock index futures contract where the underlying asset is an index such as the Standard & Poor's 500 or the New York Stock Exchange Index. Delivery of every stock in the index clearly would be impractical. Hence, the contract calls for "delivery" of a cash amount equal to the value that the index attains on the maturity date of the contract. The sum of all the daily settlements from marking to market results in the long position realizing total profits or losses of $S_T - F_0$, where $S_T$ is the value of the stock index on the maturity date T, and $F_0$ is the original futures price. Cash settlement closely mimics actual delivery, except the cash value of the asset rather than the asset itself is delivered by the short position in exchange for the futures price.

Futures margins are different from stock margins. The margin requirement for a stock earlier discussed is essentially a down payment for a security to be owned. The investor who trades on margin has all the rights and privileges of an outright owner. This is not true with futures contracts. When a stock is purchased, the new owner assumes control over the voting rights, whereas with futures contracts only price risk is transferred. Also, because of daily mark to market, the need for enormous collateral on futures contracts is minimized. A futures margin is just a performance bond that insures that both parties will fulfill their obligations.

The clearinghouse plays a key role in futures trading. The clearing system guarantees both sides of a futures contract.

The clearinghouse not only helps eliminate default risk but also guarantees the quality of the goods delivered. Most commodity futures contracts have a specified quality level, and the clearing system makes sure that a commodity of the appropriate quality is delivered.

The clearinghouse also facilitates the exchange of daily cash flows between the winners and the losers. It makes sure that both the buyer and the seller of futures contracts provide adequate collateral. As was seen the clearing system requires brokers to impose initial margin requirements on both buyers and sellers, mark to market the accounts of buyers and sellers every day, and impose daily maintenance margin requirements on both buyers and sellers.

The clearinghouse thus plays at least four vital roles in futures transactions:

1. Banker. The clearing system provides for the exchange of profits and losses.
2. Inspector. The clearinghouse insures good product delivery.
3. Insurer. The clearing system guarantees that each trader will honor the contract.
4. Liquidity maintainer. The clearing system facilitates "reversing trades".

Option trading occurs on exchanges, over the counter, and directly between buyers and sellers. There are many different exchanges on which options are traded. The most active option exchanges are the Chicago Board Options Exchange (CBOE), the American Stock Exchange (AMEX), the Chicago Board of Trade (CBOT), the Philadelphia Stock Exchange (PHLX), the Chicago Mercantile Exchange (CME), and the Pacific Stock Exchange (PSE).

Option transactions are similar to stock transactions. For example, if Mr. Q decides to buy call options on Compaq, he would call his broker and state his desires. The broker would communicate this order to the appropriate option exchange, where the trade would occur with either an investor wanting to sell call options on Compaq or with the market maker.

The Options Clearing Corporation ("OCC") maintains the records of option trades and is one of the major clearinghouses. The OCC is owned and backed by several exchanges (such as the CBOE, AMEX, NYSE, and PHLX). Hence, the OCC is a very creditworthy corporation. Similar to what was seen for futures clearinghouses, the OCC issues all option contracts and guarantees both sides of the contracts. Thus, the option buyer does not have to evaluate the credit risk of the option writer. Also, all option contracts have standardized features that make them easier to resell, thus enhancing the option contract's liquidity. The OCC processes all transactions related to option trading and imposes margin requirements on options writers (i.e., sellers).

The OCC makes it possible for buyers and writers to close out their positions at any time. If a buyer subsequently becomes a writer of the same contract, meaning that the buyer later "sells" the contract to someone else, the OCC computer will note the offsetting positions in this investor's account and will simply cancel both entries. Consider an investor who buys a contract on Monday and then sells it on Tuesday. The computer will note that the investor's net position is zero and will remove both entries. The second trade is a closing sale because it serves to close out the investor's position from the earlier trade. Closing sales thus allow buyers to sell options rather than exercise them. This process serves the same purpose as "reverse trades" in a futures transaction and facilitates market liquidity.

When an optionholder exercises an option, the OCC arranges for a member firm with clients who have written that option to make good on the option obligation. The member firm selects from its clients who have written that option to fulfill the contract. The selected client must deliver, for example, 100 shares of stock at a price equal to the exercise price for each call option contract written or must purchase 100 shares at the exercise price for each put option contract written.

Clearly, securities transactions are hampered in their efficient follow-through by the multiplicity of clearing systems. The commonality of many of the functions of the different clearinghouses suggests that numerous clearing systems can be combined and service different exchanges or even different types of exchanges, e.g., exchanges on which futures and options are traded. Thus, inefficiencies associated with duplication of function exist.

In addition, the existence of multiple clearinghouses means that a single customer's collateral or margin must be available at many clearing systems. This duplication of margin occurs even if the combined amount of that customer's margin exceeds the aggregate amount of risk borne by the multiple clearinghouses.

Moreover, communication techniques between the exchanges and the clearing systems are frequently structured in batch fashion. Information about trades will be communicated once daily or at selected intervals during the days, e.g., after periods of hours or minutes. This delay in communication can produce numerous inefficiencies. For example, if a trade, not yet reported to the clearinghouse, reduces the risk of the customer's position, the clearing system will be over-collateralized and the customer may not have the collateral available to support other transactions until the information is transmitted to the clearinghouse. Conversely, if the trade increases the risk of the customer's position, the clearing system will be under-secured for a period of time. Delays in communication can also lead to increased risk with real costs. An example of a risk is a delivery or risk that is caused by someone on one side of a trade being unable to pay for or deliver what was sold.

What is needed therefore is a system that links multiple financial exchanges, trading a variety of securities, to a single clearing system. What is also needed is immediate communication of trading information to the clearing system.

BRIEF SUMMARY OF THE INVENTION

In view of the above, the present invention provides a system and method for linking a system of trading financial instruments to a system of clearing transactions in financial instruments.

In a first aspect of the present invention, the linking system includes a network linking at least one trading system and a clearing system. An external interface couples the trading system to the network while a clearing interface couples the clearing system to the network. A transmitter module transmits trading information in at least one kind of financial instrument along the network from the trading system to the clearing system. That transmitting selectively occurs approximately simultaneously with the arrival of the trading information at the external interface. In another embodiment, information on more than one trade may be bundled and then sent to the clearing system.

In one embodiment of the present invention, the at least one trading system of the linking system is a plurality of trading systems. In another embodiment, the at least one kind of financial instrument managed by the linking system is a plurality of kinds of financial instruments. In another embodiment of the present invention, the transmitting of trading information by the transmitter module included in the linking system occurs independently of the selection of trading algorithm or clearing algorithm.

A second aspect of the present invention involves a computerized method for coupling a trading system and a clearing system. A network links at least one trading system and a clearing system. The method couples the trading system to the network at an external interface and the clearing system to the network at a clearing interface. Transmission of trading information in this method occurs along the network from the trading system to the clearing system. That transmission selectively occurs approximately simultaneously with the arrival of the trading information at the external interface. The trading information covers trades in at least one kind of financial instrument.

In one embodiment of the method, the at least one trading system is a plurality of trading systems. In another embodiment, the at least one kind of financial instrument involved in the computerized method is a plurality of kinds of financial instrument. In another embodiment, the transmitting of trading information in the computerized method occurs independently of the selection of trading algorithm or clearing algorithm. As mentioned earlier, financial instruments include, but are not limited to, securities, stocks, bonds, commodities, futures, interest rate derivatives, currencies, currency derivatives, goods such as tangible goods, goods such as intangible goods, and services. The invention is meant to include event driven trade links between trading and clearing systems for any financial instrument, regardless of the underlying right.

The following figures and detailed description of the preferred embodiments will more clearly demonstrate these and other features, and advantages of the invention.

DETAILED DESCRIPTION OF THE PRESENTLY PREFERRED EMBODIMENTS OF THE INVENTION

Figure 1:
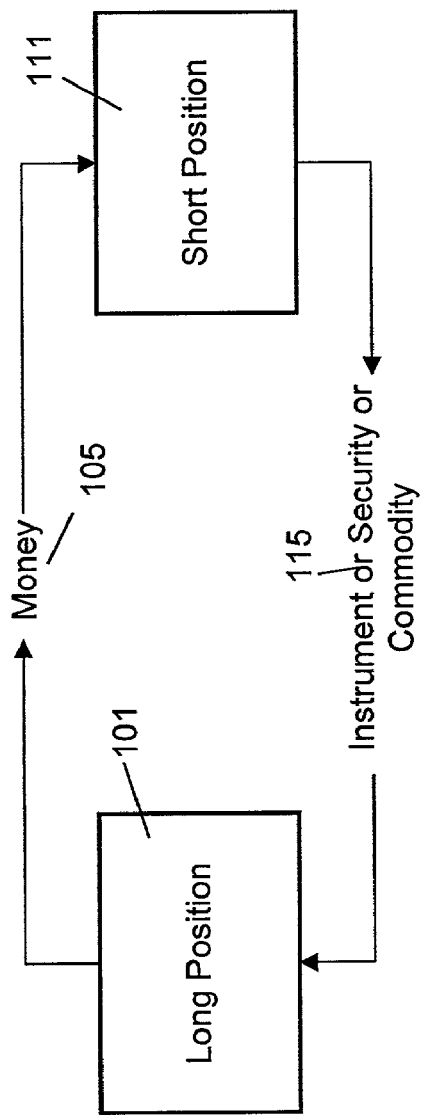
FIG. 1 depicts a prior art financial instrument transaction (such as in commodities) between a buyer (long position) and seller (short position)
Figure 2:
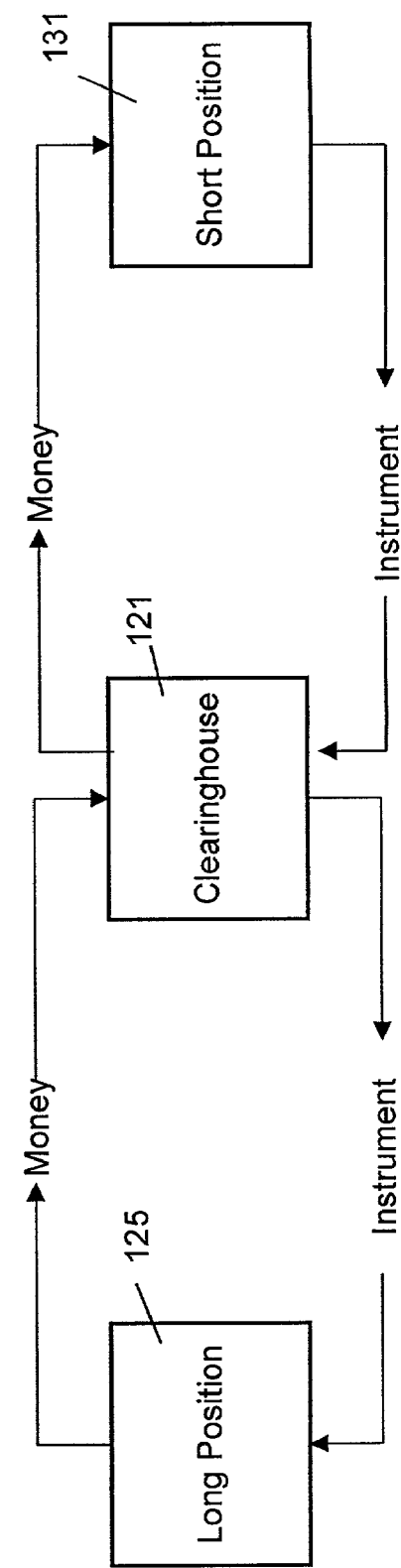
FIG. 2 depicts a prior art transaction between a buyer (long position) and seller (short position) after the intervention of a clearing system.
Figure 3:
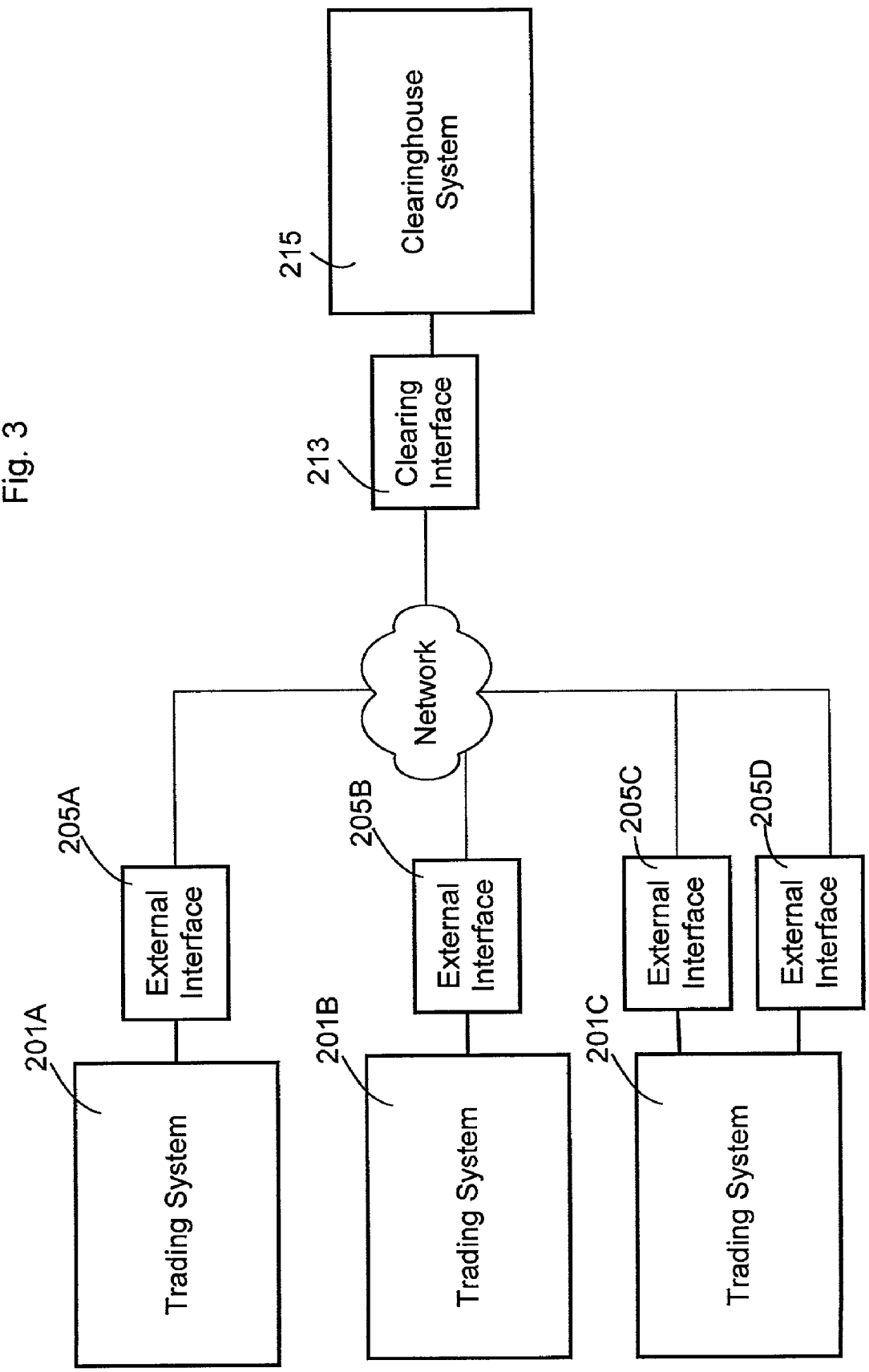
FIG. 3 is a block diagram of a plurality of trading systems and their external interfaces, all networked to a single clearing system.

FIG. 3 depicts a general block diagram showing the host servers 201A-C of a number of trading systems, the external interfaces 205A-D of each of the trading systems and the network or linkage 211 of the external interfaces 205A-D to the clearing interface 213 of clearinghouse 215. The clearing system 215 itself may be connected to the linkage in a variety of ways, one of which will be discussed below. For convenience but without any suggestion of limitation, later figures may depict only one trading system and one external interface. (The "external interface" may sometimes be referred to as "external trading interface" in contexts where any confusion is possible due to references to interfaces on the clearing system side of the network.) A trading system may have more than one external interface.

I. External (TRADING) Interface

Figure 4:
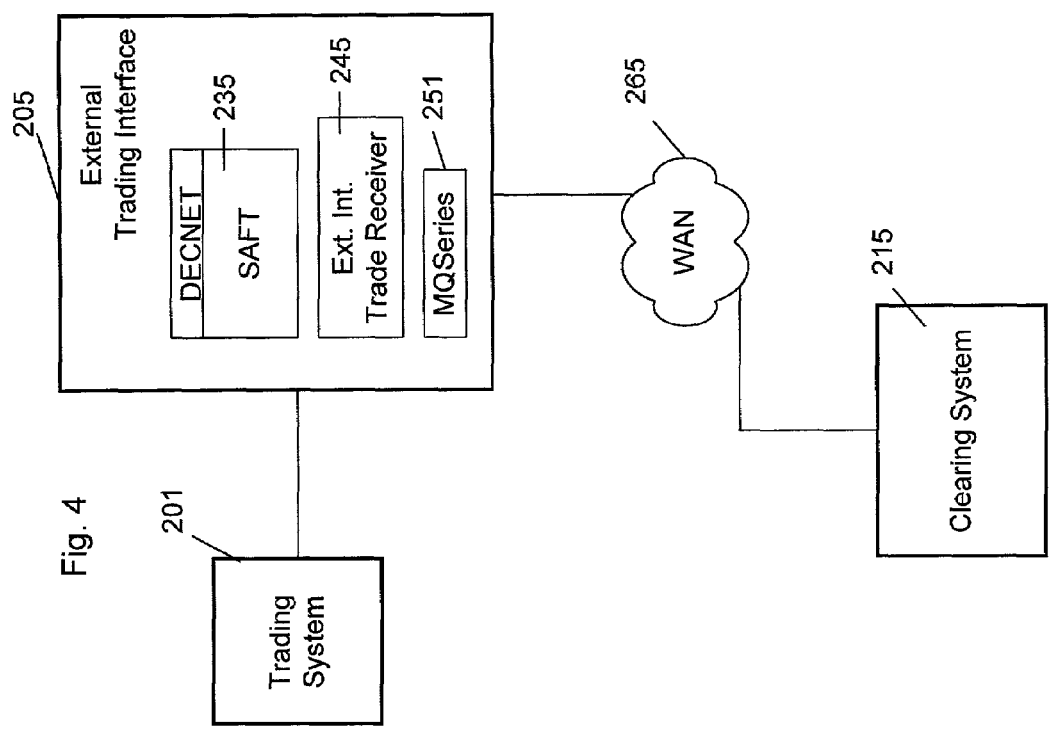
FIG. 4 is the same block diagram shown in FIG. 3, but showing only one trading system and the detail of its external interface.

FIG. 4 depicts a block diagram of the same system shown in FIG. 3 linked by a WAN 265, but for clarity with only one trading system and its host server 201 and one external interface ("EI") 205 shown. The internal detail of the external interface 205 relevant to the linkage to the clearing system 215 of one embodiment of the external interface is shown. The external interface in one embodiment is actually the coupling of two computers, an IBM mainframe using MQ Series software 251 and a DEC 235. In this embodiment, the IBM mainframe is the transmitter, or transmitter module, for sending information from the trading system to the clearing system. Also present is External Trade Interface receiver 245. The operating system is MVS, preferably operating in COBOL language. Other mainframes or other computers, and other operating systems, from other vendors can be employed, as will be apparent to those of skill in the art. In brief the external interface will support three types of data transfers: Position Transaction Records (message based) which are position transactions sent to the clearing system for clearing, End-Of-Session Record (file based) which is a single record included in the reconciliation file sent to the clearing system in order to indicate the ending sequence number and Contract Volume Records (file based) which are contract balancing records in the reconciliation file containing the total buy quantity for each series or contract. The most frequent of these transfers are the position transaction records.

A. External Interface Architecture

Figure 5:
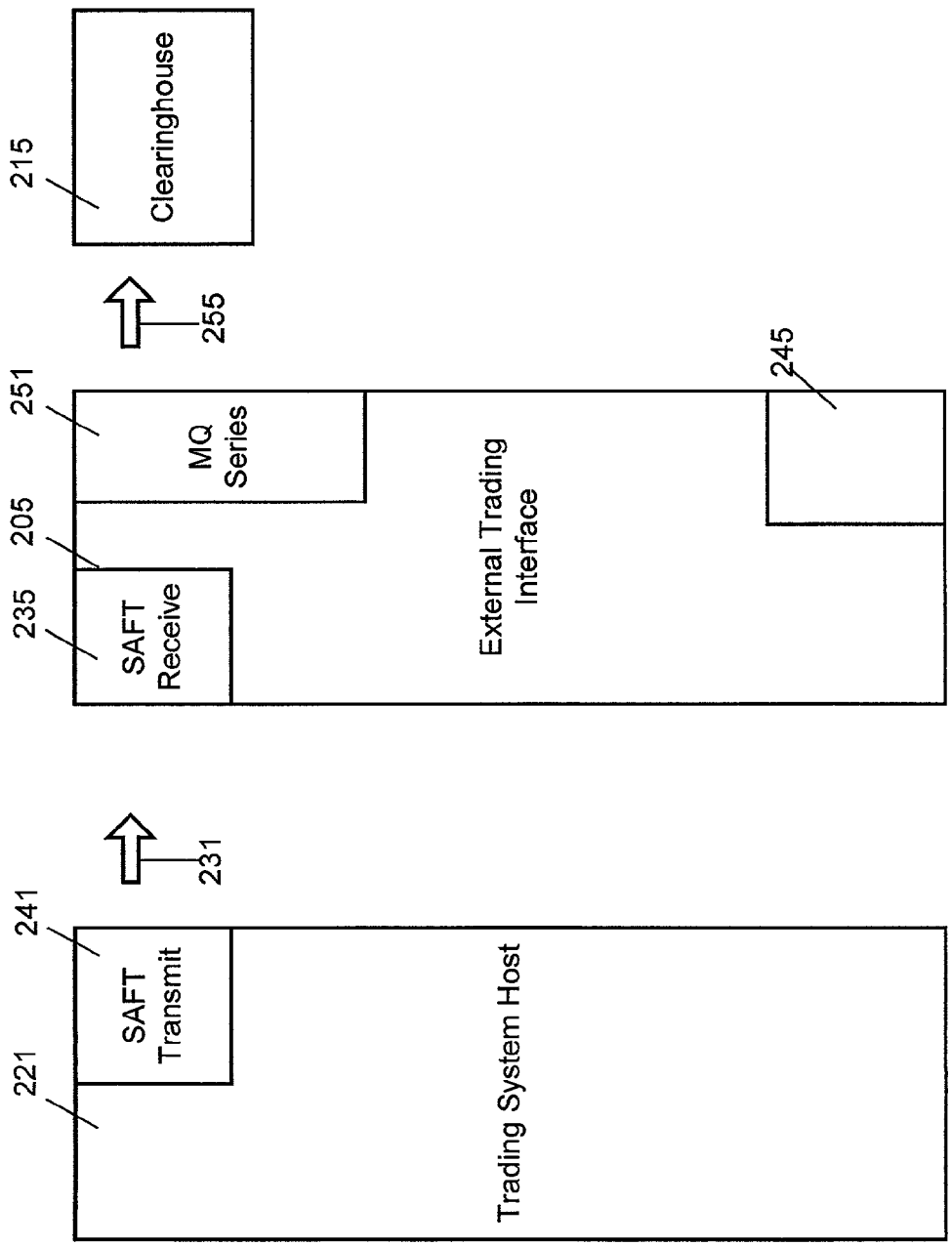
FIG. 5 is a flow diagram of the information transferred from the trading system through the external interface to the clearinghouse.

FIG. 5 depicts the information flow of the FIG. 4 system in greater detail. The external interface architecture is largely message-based, reflecting the importance of the position transaction records. A store and foreword transport ("SAFT") mechanism 231 will be used. A SAFT receiver 235 will be running on the external interface 205 to receive the position transaction records sent by a SAFT transmitter 241 in the host trading system 221. SAFT writes the records into a new file. An external interface Trade Receiver EI_TRD 245 reads the position transaction information file to extract the newly arrived records, packs one or more of them into one message, assigns a message sequence number and passes them to the a queue for transmission by a computer using MQSeries middleware 251. The number of transactions triggering the message may be selectable according to the needs of the user. Every transaction may be sent individually (polling), or a greater number may be bundled and forwarded for processing. (MQSeries, a product of the IBM Corp. of Armonk, N.Y., is discussed in greater detail below.) In one embodiment, the external interface Trade Receiver 245 can also be manually triggered and can resend messages to the clearing system starting with a defined sequence number. After the messages are queued in the external trading interface, MQSeries 251 will transport the position transaction records 255 to a corresponding MQSeries queue (not shown) running at the clearing system 215.

The reconciliation file sent to the clearing system 215 mentioned above is generated as follows. This reconciliation file is created during the batch of the trading system host 201. A batch mainline calculates the total traded quantities for each contract, writes them to a reconciliation file and creates an "End-of-Session" (or "End-of-Day") record which contains the last sent sequence number of the position transaction messages previously sent to the clearing system. Afterwards this file is sent from the trading system host 201 to the external interface 205 by another batch step via DECNET copy. All records from this file are forwarded, of course, by the external interface trade receiver 245 process to the MQSeries message queue 251.

In one embodiment "End-Of-Session" information and "Contract Volume" data will be sent in one file with "End-Of-Session" information being the first record. This file will be transferred after all position transaction records have been sent, generally at the end of a trading day.

In one particular embodiment, the operations architecture can offer several additional features. First, the start/stop of the SAFT receivers 235 on the external interface 205 is included in the operations menu of the trading system host 221. Second, the external interface trade receiver process 245 is started automatically during the usual external interface startup. In addition, a menu item is added to the host menu to start and stop external interface trade receiver manually. In one embodiment a start record number can be provided to the external interface trade receiver process to handle retransmit requests. Third, the trading system host 221 initiates the clearing system reconciliation file transfer during the daily batch procedure of the trading system. This batch step copies the reconciliation file to the external interface and starts a process that reads the reconciliation file and forwards all records to the message queue in MQSeries 251. Fourth, a menu item is available on the trading system host 221 to allow a manual re-initiation of the clearing system reconciliation file transfer. Finally, during the DEC-NET copy and the forwarding of the reconciliation file to the clearing system 261 a log file is generated that allows verifying the successful execution of the file transfer. A menu item is available in the trading system operations menu to access this log file.

In another embodiment, the system will also support combination/spread orders and trades. Combination/spread orders/quotes are entered with a price differential and the two legs are matched as individual orders/quotes which include the execution price. Combination spread orders can be identified as combination orders in the position transaction record, but in this embodiment the legs cannot be linked.

Figure 8:
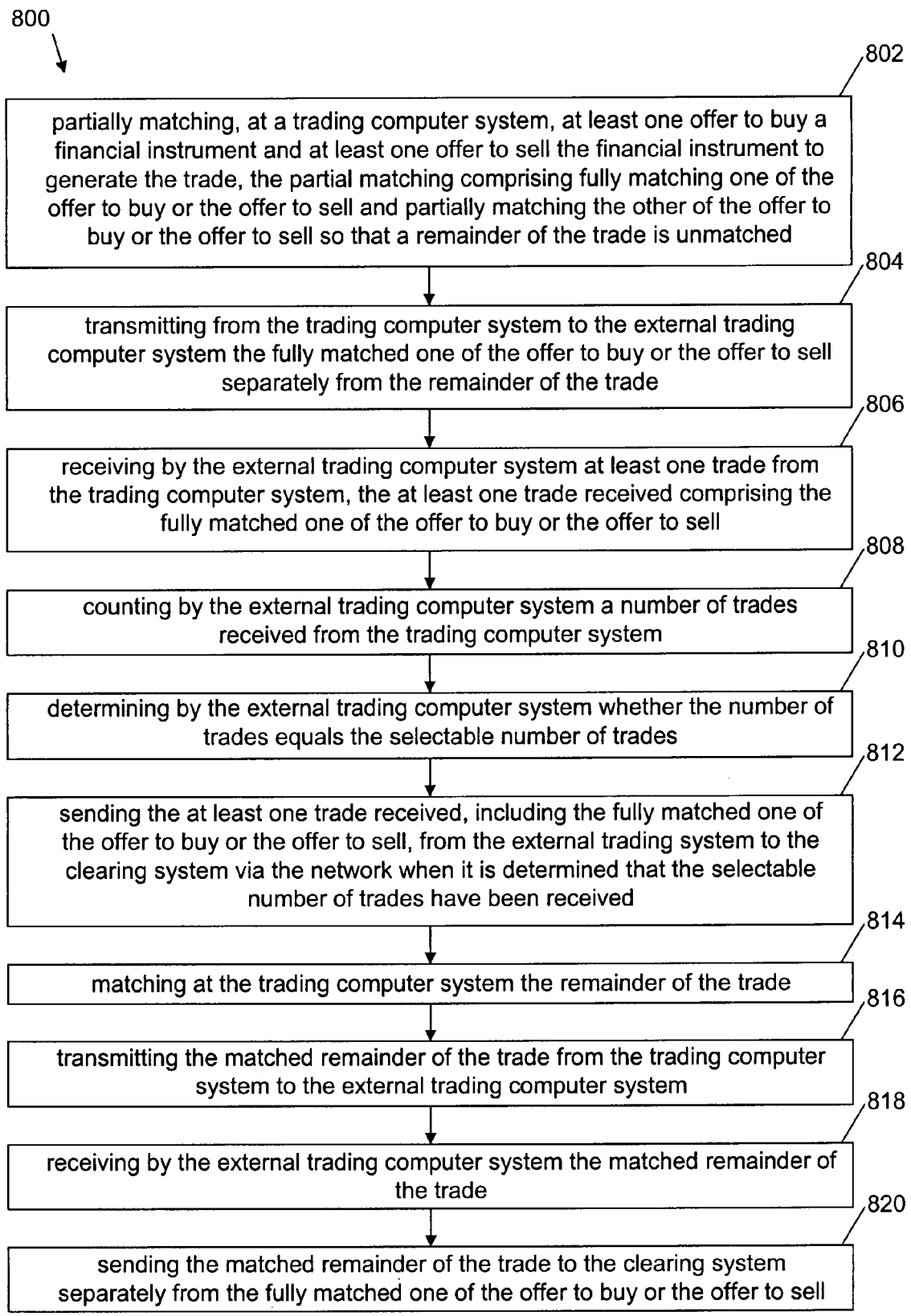
FIG. 8 is a flow chart for partial matching of a trade.

FIG. 8 is a flow chart 800 for partial matching of a trade. As shown at block 802, at least one offer to buy a financial instrument and at least one offer to sell the financial instrument partially matched at a trading computer system to generate the trade, with the partial matching comprising fully matching one of the offer to buy or the offer to sell and partially matching the other of the offer to buy or the offer to sell so that a remainder of the trade is unmatched. As shown at block 804, the fully matched one of the offer to buy or the offer to sell is transmitted from the trading computer system to the external trading computer system separately from the remainder of the trade. As shown at block 806, at least one trade is received by the external trading computer system from the trading computer system, the at least one trade received comprising the fully matched one of the offer to buy or the offer to sell. As shown at block 808, the external trading computer system counts a number of trades received from the trading computer system. As shown at block 810, the external trading computer system determines whether the number of trades equals the selectable number of trades. As shown at block 812, the external trading system sends to the clearing system via the network the at least one trade received, including the fully matched one of the offer to buy or the offer to sell, when it is determined that the selectable number of trades have been received. As shown at block 814, the trading computer system matches the remainder of the trade. As shown at block 816, the trading computer system transmits to the external trading computer system the matched remainder of the trade. As shown at block 818, the external trading computer system receives the matched remainder of the trade. As shown at block 820, the matched remainder of the trade is sent to the clearing system separately from the fully matched one of the offer to buy or the offer to sell.

B. Data Transport to the Network

Figure 6:
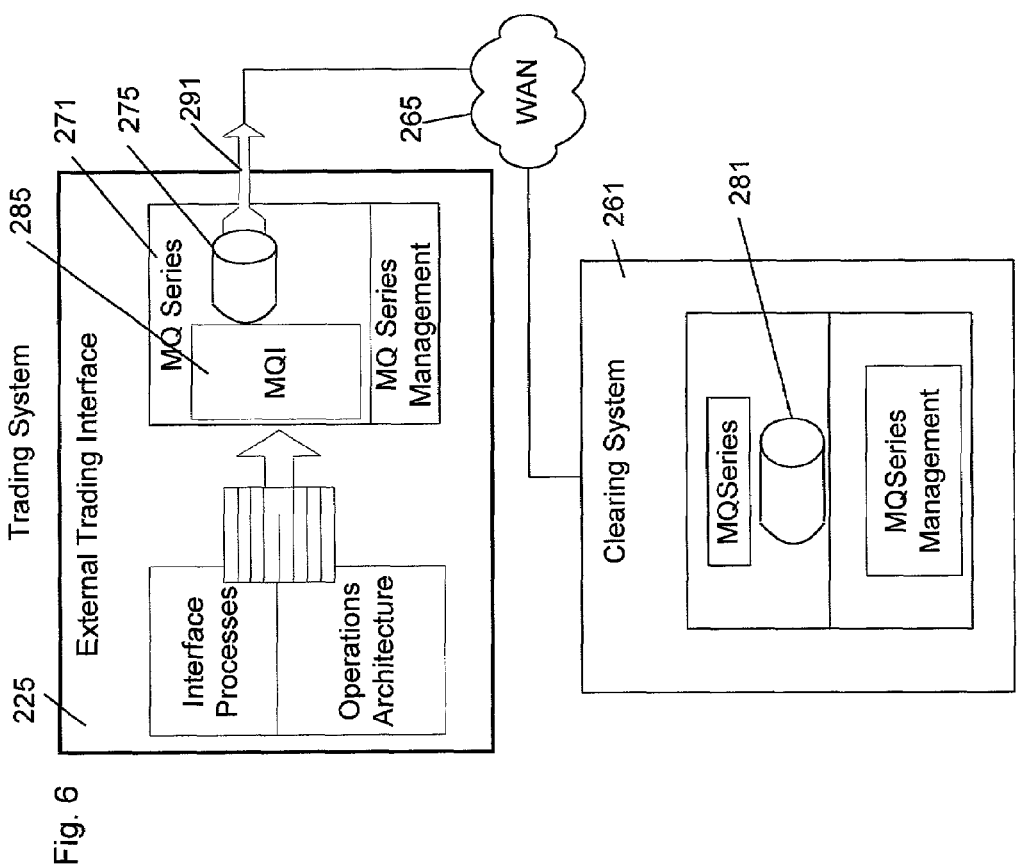
FIG. 6 depicts the transport mechanisms sending records from the external trading interface to the clearing system.

The transport mechanisms used to send position transaction records from the External Interface to the clearing system is preferably based on MQSeries 271 using TCP/IP and is depicted in FIG. 6. The process of linking, and transmitting data from, the external interface 225 to the network 265 and thereby to the clearing system 261 will now be discussed in greater detail. An external interface server 225 attached to the trading system host provides a single exit or terminal point from the trading system to the clearing system 261. Very generally, software on the trading system will transmit position data to the clearing system for clearing processing. A sequence number is assigned to each position transaction record. The external interface will deliver position transaction records as MQSeries messages from the trading system. Additionally, during batch processing, the interface will transfer a file record by record to the clearing system transmitting total traded quantities and the last sent sequence number in the position transaction records.

MQSeries 271, message-oriented middleware, or other middleware can be employed in more than one function. The middleware will send position transaction records to the clearing system. The middleware will ensure all records are delivered even after a connection failure. All trades will be forwarded in a peer-to-peer configuration that will require a transmission queue 275 on the External Interface and a remote queue 281 on the clearing system 261. The MQSeries provides an application programming interface known as MQI 285. The components on the external interface 225 will use MQI to perform execution functions.

In addition to the message-based transmission of position transactions over MQSeries 271, a reconciliation file is preferably sent also via MQSeries by distributing the records of the file into several MQSeries Messages 291. This reconciliation file provides the clearing system with the total traded quantities per contract and the last sent sequence number.

C. Position Transaction Records

The preferred normal processing of position transaction records is as follows in detail. The sending SAFT 241 process forwards the position transaction records from the Trading System host 221 to the External Interface 225 where the receiving SAFT 235 stores them in a file. At a configurable and selectable interval, which can be every single transaction) but more typically is several transactions, e.g., 10, a process on the External Interface 225 reads all newly arrived position transaction records and forwards them via a transmitter module using MQ Series middleware 271 to the clearing system 261. The External Interface process will store up to a maximum number of position transaction records into an MQSeries Message 291 and will place the message into the queue 275 using the MQI API ("Applications Programming Interface") 285. This maximum number has to be specified.

One embodiment accounts for several anomalies. If the message cannot be passed successfully to MQSeries 271 an error will be formatted and the external interface process exits. This is considered to be a serious error and has to be solved by normal MQSeries operations with manual intervention. If the clearing system 261 does not successfully receive a record, retransmission requests will be manually triggered by the clearing system. The clearing system 261 will communicate to the host trading system 221 a starting message sequence number to retransmit. The trading system will manually configure the External Interface 225 process to send messages at a starting retransmission message sequence number until the end of the available messages. This manual intervention could cause the interface to transmit duplicate position transaction records to the clearing system when subsequent records have already been sent. The retransmission process will use the normal processing logic.

II. Clearing Interface

The clearing interface is the interface on the clearing system side of the network from the trading system to the clearing system 261 and is part of the clearinghouse. The clearing interface is comprised of the functionality to receive input from the trading system and convert that input to enriched output that can be used by the remainder of the clearing system.

A. Overview of the Clearing Interface

The trading system 221 provides trade data to the clearing system 261 for clearing processing. This data is sent as position transactions in POSTRN format using MQSeries from the External Interface 225 to the clearing interface in the clearing system. POSTRN format is the format used by the trading system indexed by sequence number and contains position transactions for the current trading day. From these position transactions the clearing interface re-creates the messages in the appropriate format. This format will be referred to as "TREX" format and is the trade record format containing trade information for both the buy side and sell side of a trade for transfer to the clearing system downstream systems. Other formats could be used, but these formats are established and are the best way known presently.

Figure 7:
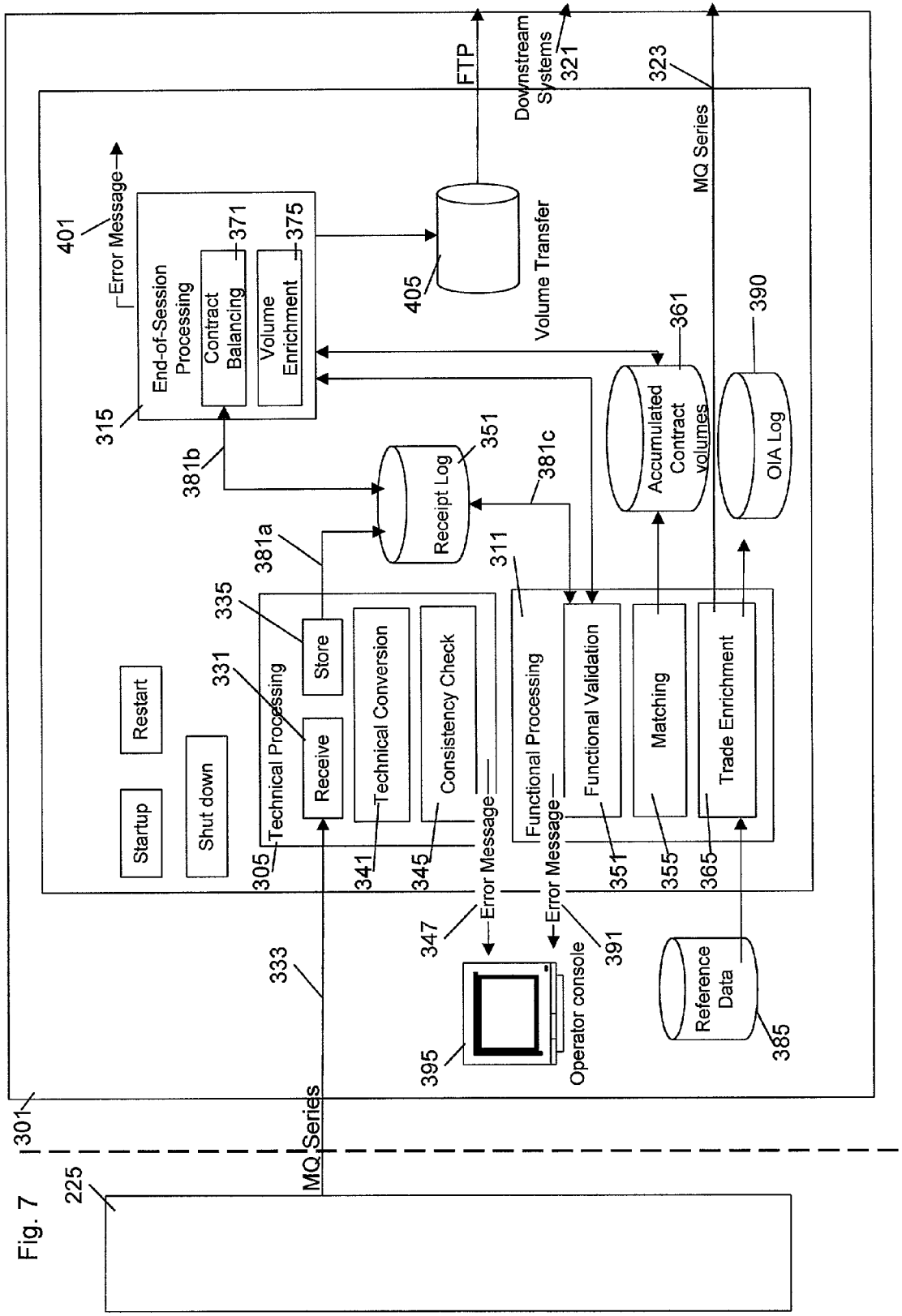
FIG. 7 is a detailed flow chart of the operation of the clearing interface and its linkage to the external interface and downstream systems of the clearinghouse.

FIG. 7 depicts the scope of the clearing interface 301. FIG. 7 shows the link to the external interface 225, three main processing components 305, 311, 315 and related databases and files of the clearing interface, and the downstream link 321 to the remainder of the clearing system.

The clearing interface consists of three main processing components, each of which will be described in detail below. Briefly, however, a technical processing component 305 receives 331 messages in queues from the MQ Series 333 containing POSTRN, end-of-session and contract volume records from the external interface 225. This component also converts 341 regular fields from ASCII to EBCDIC and computational fields (binary coded numbers) from little endian to big endian format, performs a consistency check 345 on the message sequence number, and finally stores the records into a receipt database 351. "ASCII" refers to the American National Standard Code for Information Interchange, the preferred character set used by the trading system and external interface. "EBCDIC" refers to the Extended Binary Coded Decimal Interchange Code, the preferred character set used by the clearinghouse.

A functional processor 311 performs a functional validity check 351 of the clearing firm and matches 355 the buy and sell sides belonging to one trade. This component also accumulates the contract volumes 361, and performs the necessary conversions 365 form the POSTRN format to the TREX format. The functional component also performs a completeness check of the matching activities at the end of the session.

The third and final main processing component is an end-of-day processing component 315 that checks the trading system contract volumes 371 against the volumes accumulated during the day by the functional component. This component also performs the necessary conversions 375 for accumulated volume and contract volumes from one format, such as JVR1, to the volume transfer format, such as the BOTCC format. In some embodiments, no conversion is necessary.

B. Interface Communications

The input interface between the external interface 225 and the clearing interface 301 is realized through the use of MQSeries 333, as previously discussed. The clearing interface passes on trade records to the clearinghouse downstream systems 321 also using MQSeries 323. The core interface process sends one composite TREX record containing the buy and sell sides of a trade within a single MQSeries message. Messages are sent after successfully matching orders belonging to one transaction identifier and enriching the resulting trade.

The communication between the processes 305, 311, 315 of the clearing interface will preferably use transient data queues, e.g. 381A, B, C. One queue is required for communication between the technical component 305, sometimes herein called the "input interface", and the functional component 311, a second queue is required for communication between the technical component 305 and the end-of-day component 315. Processing in the functional component 311 and the end-of-day component 315 is triggered by data arriving in the transient data queue and will continue until the queue is empty. Recovery capability is preferably available to ensure data consistency at all times during the processing. This includes data in queues 323, 333 from and to MQSeries, the transient data queues 381A, B, C and the databases. Read and write processes from and to the MQSeries queues and the transient data queues are synchronized with the database updates so that in case of a failure all input and output channels can be rolled back to a defined and consistent position.

C. Detailed Architecture

1. Technical Component

In the preferred embodiment the technical component 305 performs all technical processing of the clearing interface 301 and in one embodiment is an IBM 9672 mainframe. The operating system in this embodiment is OS/390. Other mainframes or other computers, and other operating systems, from other vendors can be employed, as will be apparent to those of skill in the art. This includes interacting with MQSeries 333 to receive the data sent by external interface 225, performing technical conversion of the data 341 and storing it in the receipt log 351. The technical component also verifies that all trade records sent are received by performing a consistency check 345 on the sequence number. The database management system in one embodiment is DBMS available from IMS, employing a virtual sequential access methodology.

a. Receive

During the trading day as was discussed the sending process on the external interface 225 forwards all newly arrived position transaction records via MQ Series 333 to the clearing interface 301 in bursts at defined transaction intervals. At the end of the trading day as was also discussed, when the trading system is in batch processing, that system sends an end-of-session record and contract volume records. These may include a daily volume for an actively traded contract at an end of a trading day. As described below, the system may also check to see whether the daily volume corresponds to an accumulated volume corresponding to the actively traded contract.

The end-of-session record is a single record in a single MQSeries message. The contract volume records are packaged in groups just like the position transaction records.

On the clearing interface 301 the incoming messages from the MQ Series 333 are obtained from the MQSeries queue one by one until all messages of a burst have been read and the depth of the queue is zero. Each message obtained from the queue is stored 335 in the receipt log 351 as individual records before the next message is taken out of the queue. For each record in the message the data is passed to the technical conversion process 341 for conversion and storage 335 in the receipt log 351 (the original MQSeries message is not stored). In case the message received contains position transaction records, the messages passed on to the consistency check 345 before writing it to the database.

b. Technical Conversion

The messages received, as was seen, are in ASCII format with embedded computational fields in DEC binary, little endian format. Regular fields, i.e., fields that contain plain alphanumeric characters, are converted to change each ASCII character to the corresponding EBCDIC character.

Computational fields on the trading system hardware (in one embodiment, DEC) are stored in a different byte order—least significant first—than on the clearing system hardware (in that embodiment, IBM)—most significant first. Therefore, the bytes have to be swapped into the right order to ensure the value is interpreted correctly by the clearinghouse system 321. Of course, the little endian to big endian conversion is necessary only for messages containing position transactions. The end-of-session message and the contract volume messages do not contain computational fields.

c. Consistency Check

Each position transaction record sent by the external interface 225 has a unique sequence number that is continuously incremented by one for each record. The consistency check 345 verifies that the sequence number of the current record is one greater than the sequence number of the previous record received. If a sequence number is missing, manual intervention at both the trading system and the clearing system) is necessary to resolve the problem. In case of a duplicate sequence number the second record is ignored. The consistency check, however, is only performed for messages containing position transactions and for end of session messages. When the end-of-session message is received, the sequence number of the last position transaction record received is checked against the last sequence number sent that is contained in the end-of-session message. When a contract volume message is received, no consistency checking takes place.

All records that pass the consistency check 345, are stored 335 in the receipt log 351. In performing this functionality, the technical component, of course, functions as a storage device and is sometimes herein called that. A duplicate sequence number does not result in error processing, the second record is skipped and a warning message is displayed to the operators. In case a sequence number received is greater than the last sequence number plus one (i.e., a sequence number is missing: $seq_n+1 < seq_{n+1}$) or if the sequence number in the end-of-session message is not equal to the last received sequence number, the consistency check fails. An error message 347 is displayed to the operators 395 and the processing ends. However, records from the same message processed successfully before the error are stored in the receipt log 351. Manual intervention on both the sending and the receiving sides (i.e., the trading system and the clearing system) is necessary to resolve the problem.

d. Store

All records that pass the consistency check (or for which no consistency check is performed, i.e., volume records) are written to the receipt log 351 by a store operation 335 by the technical component, i.e., storage device as mentioned above. This database stores all messages that were successfully received 331 and converted 341. Each record is stored with an initial status of unmatched. The status is later used, as will be seen, by the matching functionality to keep track of the position transaction records partially or fully matched. After each record is stored, processing continues with the conversion of the next record in the message.

For position transaction messages the following messaging logic is invoked. Due to the fact that the sequential input file used by the external interface 225 to create the messages for the clearing interface 301 is written by multiple posting processes running on the host trading system, transactions belonging to the same trade generally do not arrive in sequence but are mixed with transactions from other trades. The technical component 305 of the clearing interface levels out this disorder by keeping track of the received transaction numbers. After defined intervals (at the latest when the MQSeries queue is empty), records with one or more transaction identifiers are passed on to the functional processing component 311 so that component can perform its processing.

A selection algorithm can render this transferring process more efficient. For example, suppose records with transaction identifiers are received in the following order: '1', '2', '3', '1', '4', '2', '1', '1', '3', '4', '4', '3', '1', '5', '2', '6', '3', '4', '5'. A defined interval for this example could be selected as every fifth new (i.e., previously not occurred) transaction identifier. In this example records with the transaction identifier '1' are passed on when '5' occurs for the first time; all other records are held back. When '6' arrives, records with identifier '2' are passed on and so forth. With such an algorithm the likelihood of having already received all trades belonging to the same transaction identifier is significantly higher compared to an algorithm where every change (i.e. a defined interval of "one") in the transaction identifier triggers passing on records with the previous identifier. If transmission occurs without such an algorithm, the transmission is said to be independent of the algorithm.

The end-of-session message is also sent to the functional processing component 311. However, the contract volume record is sent to the end-of-day (or session) processing component 315 for contract balancing processing. As mentioned above, this will typically include daily volumes and a check on the accumulated volume 2. Functional Component The functional component or "functional processor" 311 performs all intra-day functional processing, ensuring that all trade data required is made available to the clearinghouse downstream systems. This includes functionally validating 351, matching 355 and enriching 365 the position transaction data received and stored by the technical component 305. Enriched TREX records are then passed on to the clearinghouse downstream systems 321 via MQSeries 323.

The processing in the functional component 311 is triggered by a transaction identifier sent from the technical component. All position transaction records with that identifier are retrieved from the receipt log 351 so that processing is done for one trade at a time. After a record has passed the functional validation 351 it is put in a buy or sell table for matching 355. If the message from the technical shell signifies the record is an end-of-session message, the normal functional processing is skipped and a matching completeness check is performed.

a. Functional Validation

Trades to be cleared in the clearing house systems need to be associated with a valid clearing firm. In one embodiment the reference data between the trading system and the clearing system is not automatically synchronized but requires manual procedures. Conceivably, therefore, a new clearing firm is set up in the trading system, admitted to trading, when it is not set up in the clearing system. Accordingly, position transactions from clearing firms unknown to the clearing system could be transmitted. The clearinghouse downstream systems 321 would reject and drop such transactions.

To prevent the loss of position transactions the clearing firm of an incoming transaction is validated 351 against the clearing system reference data 385. If the clearing firm is not found in the reference data, this transaction is flagged as an error. Manual intervention is required to update the reference data 385 and trigger the reprocessing of the transaction by the functional component 311. If the clearing firm validation fails (i.e., the firm is not found in the clearing system reference data 385), then an error message 391 is displayed to the operators 395 and the transaction is written back to the receipt log 351 marked as an error. Other transactions belonging to the same trade identifier are not changed but normal processing continues for them.

If the clearing firm validation 351 is successful then the transaction is put into either the buy or the sell table. Each table is an internal memory table that is used during the matching process 355. The trading system POSTRN format keeps long and short positions of a position transaction rather than the execution quantity. Therefore the execution quantity is calculated from the transaction long and short quantities before the record is put into the buy or sell table for matching. For regular trades, adding the absolute values of both quantities gives the execution quantity. In one embodiment Table 1 provides an overview of, and trading algorithm for, the different possibilities of buy or sell and open or close transactions and the resulting trade quantity.

TABLE 1

| Trade Quantity or Trading Algorithm | | | | |
|---|---|---|---|---|
| Transaction | Strategy | Buy/Sell | Open/Close | Trade Quantity |
| Buy to Open | Increase long | B | O | Long Qty |

TABLE 1-continued

| Trade Quantity or Trading Algorithm | | | | |
|---|---|---|---|---|
| Transaction | Strategy | Buy/Sell | Open/Close | Trade Quantity |
| Buy to Close | Decrease short | B | C | Minus (Short Qty) + Long Qty |
| Sell to Open | Increase short | S | O | Short Qty |
| Sell to Close | Decrease long | S | C | Minus (Long Qty) + Short Qty | b. Matching

The trading system in one embodiment assigns a unique transaction identifier to all orders that are part of one matching transaction (i.e., match at one price). This is true for the time-price priority matching algorithm as well as for the pro-rata matching algorithm. However, in this embodiment the trading system does not perform counterparty assignment. During the re-matching 355 by the clearing interface 301 the assignment of the opposing broker (counterparty assignment) is performed for all orders belonging to one matching transaction. The process of re-matching is also referred to as "trade generation" in the following discussion.

The matching or closing algorithm in one embodiment of the clearing interface processes the buy and sell tables based on the first-in-first-out rule (FIFO). As long as there are buy and sell records left in the tables the algorithm always completely executes the smaller quantity and partially executes the bigger quantity. Partially executed records remain in the buy and sell tables respectively for the following match. If buy and sell quantities are the same, both are executed fully.

For example, a transaction received from the trading system consisting of three buy position transaction records with quantities of 20, 5 and 15 and two sell position transaction records with quantities of 15 and 25 would create the trades depicted in Table 2.

TABLE 2

| Matching or Clearing Algorithm Example | | | | |
|---|---|---|---|---|
| Generated Trades | Record | Buy Quantity | Record | Sell Quantity |
| 15 (1$^{st}$ buy with 1$^{st}$ sell) | 1$^{st}$ buy | 15 (of 20) | 1$^{st}$ sell | 15 (fully) |
| 5 (1$^{st}$ buy with 2$^{nd}$ sell) | 1$^{st}$ buy | 5 (remainder) | 2$^{nd}$ sell | 5 (of 25) |
| 5 (2$^{nd}$ buy with 2$^{nd}$ sell) | 2$^{nd}$ buy | 5 (fully) | 2$^{nd}$ sell | 5 (of remaining 20) |
| 15 (3$^{rd}$ buy with 2$^{nd}$ sell) | 3$^{rd}$ buy | 15 (fully) | 2$^{nd}$ sell | 15 (remainder) |

For each match 355 the receipt log 351 is updated with the new status of the involved position transaction records (fully matched or partially matched) and the remaining quantity. As a result, the receipt log gives an exact picture of the matching process at any time. Each generated trade is passed on to the enrichment process 365 for conversions and formatting of the composite TREX record. Since there is no guarantee that the external interface 225 sends all position transaction records belonging to one transaction identifier before records of another transaction identifier are sent, it is possible that buy or sell position transaction records remain in the table without any matching opposite records. These records are matched 355 when the remaining position transaction records belonging to that transaction identifier are received later on within the same trading day. While this description focuses primarily on matching trades, one side with the other, the system will work as well, or even more efficiently, for recording and clearing completed trades, including both buy and sell sides of each trade.

The accumulated contract volume database 361 is used to accrue the volume of the current trading day for each actively traded contract. After each trade generation, the accumulated volume for the contract is increased by the quantity of the trade. At the end of the day the volume accumulated in this way is compared to the volume reported by the trading system, as will be discussed later. The accumulated contract volume database 361 also keeps statistics on the total number of buy and sell transactions. Every time a buy or a sell record is completely matched (i.e., it has no remaining quantity) the number of buy or sell transactions, respectively, in the database is increased by one.

c. Trade Enrichment

Trade enrichment 365 refers to actions that convert the generated trade from the POSTRN format used by the trading system in one embodiment to the composite TREX format used at the clearinghouse in that embodiment. Some fields can be copied as is, while others need to be calculated or derived from other fields. The following sections explain specific, more complex conversions and mappings in detail. Of course, the scope of the invention is not limited by the formats, conversion processes and references to types of individuals (e.g. "market maker") employed in any particular embodiment. Different trading systems and clearing systems other than the specific embodiment described will have different individual characteristics.

Required Reference Data

Table 3 provides an overview of the reference data fields that are required for the enrichment processes.

TABLE 3

Reference Data Required for Enrichment

| Field Name | Data Type | Description |
|---|---|---|
| Security ID | X(4) | Security id (trading system ticker symbols) |
| Fraction Type | X(1) | Trading system fraction format for the security |
| Underlying ID | X(4) | Trading system security id of the underlying (required for option strike price conversion) |
| Commodity Code | X(5) | Clearinghouse commodity code mapping to the security indentifier |
| Fraction Code (Future) | X(3) | Clearinghouse fraction format for the future commodity |
| Fraction Code (Option) | X(3) | Clearinghouse fraction format for the option commodity |

As mentioned earlier, although the activities of the trading system of one embodiment involve futures and options securities, including derivative instruments on commodities, the scope of the invention, in particular the kinds of securities, is not limited by that embodiment. As an example, a put may be thought of as a service or a right, to sell a certain number of shares at a certain price. Any other service or right that can be reduced to an amount of money may also be bought or sold on an exchange, provided there is an amount of trading sufficient to support a market. The invention is meant to include trade links between trading and clearing systems for any such goods or services.

Contract Conversion

In contract conversion the trading system security identifier is converted to clearing system commodity code conversion. In addition, the contract expiration date and the strike price (for options only) are converted. In the trading system securities are identified by a four character alphanumeric field. That field is converted to the clearinghouse commodity code, usually a two digit alphanumeric value stored in a five character alphanumeric field.

In the trading system the expiration date is in YYMM format where YY is a year offset from the reference year 1980. For example, a contract that expires in September 2000 is formatted with an expiration date of 2009. In the clearinghouse system the expiration date is in YYMMDD format where DD is always 00. Accordingly, the 2009 from the example is converted to 20000900.

Strike price conversion (for options) is very complex. In the trading system the strike price is in the fraction display format, a plain number of up to six digits. To interpret the number correctly it is required to know the fraction type of that particular security. For example, a strike price of 617 represents $61\frac{7}{8}$ if the security's fraction type is eighths, but it is $6\frac{17}{32}$ if the security's fraction type is thirty-seconds. The clearinghouse system strike price format is similar to the trading system fraction display format but has leading zeros and—depending on the fraction code—trailing zeros. Also, the fraction value might have a different number (e.g., $\frac{4}{8}$ is represented as 5, $\frac{7}{8}$ as 8). The strike prices from the example above are represented as 0000618 and 0006170, respectively.

If both the trading system fraction type and the clearing system fraction code have the same base or tick size (e.g., both are eighths) then the strike price can be separated into an integer part and a fraction remainder and the clearinghouse strike price can be formatted accordingly. If the fraction types have the same absolute minimum tick value but different tick interpretations (e.g., a fourth of thirty-seconds and a half of sixty-fourth) the trading system fraction display format must be converted into raw ticks first (495 and 209, respectively, in the above example). At this point, the same conversion rules as for the trade price apply (see below).

Trade Price Conversion

Trade prices in the trading system are stored as raw ticks, where the minimum tick value is the smallest fractional unit. If, for example, a security is traded a in fourth of thirty-seconds, the smallest fractional unit is one-hundred-and-twenty-eighths. A price of $6\frac{17}{32}\frac{1}{4}$ is then represented as 837 (=[6*32+17]4+1). If a security is traded in eighths, the smallest fractional unit is eight. A price of $5\frac{7}{8}$ is then represented as 47 (=5*8+7).

If both the trading system fraction type and the clearing system fraction code have the same minimum tick value (e.g., both are eighths) then the clearinghouse trade price can be calculated from the ticks by integer division and modulo division (remainder). In the second example above an integer division returns the whole number (47 div 8=5) and modulo division returns the fraction remainder (47 mod 8=7). Now the whole number and the fraction with the information in the reference data are used to populate the clearing system trade price field with 00000058 (as mentioned in the previous section, for eighths $\frac{7}{8}$ are represented by an 8).

If the fraction types do not have the same absolute minimum tick value (e.g., thirty-seconds and eighths) the conversion is not supported. When new commodities are set up, the minimum tick value for the clearinghouse commodity code must be the same as for the corresponding trading system security.

Trade Time Conversion

The time of a trade transaction is in trading system time. This system time has a defined offset from local time of a specific city where the clearing system in one embodiment is located. The offset is used to convert the transaction time of a trade to that city's local time. In order to be flexible and allow for changes of the offset time (e.g., different start or end date for daylight savings time) the offset value has to be configurable. Note that the transaction date is not changed during the conversion, but is always the date of the trading system business day on which the trade was executed (also referred to as "trade date").

Extraction of Specific Fields

The clearinghouse downstream systems 321 require the clearing fields "Account Number", "CTI", "Origin" and "Exchange Fee" to be populated. The clearing interface 301 extracts the values of these fields from the trading system free form text fields "Text" and "Customer". In detail the procedure is as follows. The ten left-most characters in the field "Text" provide the account number; the remaining fields are cut off and are disregarded. The first character of the field "Customer" provides the CTI (customer type indicator) code as entered by the trader. The second and third character of the field "Customer" provide the origin code as entered by the trader. The fourth and fifth character of the field "Customer" provide the exchange fee type. In each case the data was entered by the trader. These text fields are only passed through from the trading system and no additional validation is performed. As the text fields are only filled for orders while remaining empty for quotes, the clearing interface populates the clearing system clearing fields with default values for quotes as described in the following section.

Defaults for Quotes

For quotes the trading system sends the fields "Account Number", "Origin", "CTI" and "Exchange Fee" to the clearinghouse blank. The fields "Origin" and "CTI" will be populated based on the default mapping shown in the following tables; they are different for options and futures. The fields "Account Number" and "Exchange Fee" remain blank and are not filled. The field "O/C", the open/close indicator (quotes are always closing transactions in the trading system) is not filled as it is not required for clearing quotes by the clearing system.

Table 4 shows the quote default mappings for futures.

TABLE 4

Default Mapping for Quotes (Futures)

| Account | Description | Origin | CTI | Comments |
|---------|-------------|--------|-----|----------|
| M1 | Customer Market Maker | 01 | 1 | Orders executed by customer market maker for his own account |
| M2 | House Market Maker | 02 | 1 | Orders executed on behalf of house market maker who is an employee or an owner of clearing firm |

Table 5 shows the same detail for options.

TABLE 5

Default Mapping for Quotes (Options)

| Account | Description | Origin | CTI | Comments |
|---------|-------------|--------|-----|----------|
| M1 | Customer Market Maker | 04 | 1 | Orders executed by customer market maker for his own account |
| M2 | House Market Maker | 03 | 1 | Orders executed by house market maker for his own account |

Assignment of Clearinghouse Record ID

Each generated trade receives a clearing system record identifier, a number between 60,000 and 74,999 in one embodiment. This number is specific to each clearing firm and to options and futures separately. It is incremented by one for each new trade of a clearing firm in options and futures respectively and continues from one trading day to the next. Once the last trade identifier of 74,999 has been assigned to an options or futures trade of a firm, the number for that firm in options or futures is rolled over to 60,000 and starts again.

d. Store and Send

After the generated trade has been completely enriched 365 the resulting composite TREX record is written to the TREX log or OIA (Office of Investigations and Audits) log 390 database and at the same time the record is sent to the clearinghouse downstream systems 321 via MQSeries 323.

e. Matching Completeness Check

At the end of the trading day during the batch processing the trading system sends an end-of-session message indicating that all position transactions have been sent. At this time all position transactions will have undergone the matching process 355 described. If only matched records are found in the receipt log 351, all position transaction have been processed successfully. A specially formatted composite TREX record is sent to indicate the end-of-session to the clearinghouse downstream systems 321. In case there are still unmatched records found in the receipt log 351, an error message 391 is displayed to the operators 395. The accumulated contract volume 361 for the contract of the order is adjusted to reflect the missing volume. The contract balancing processing in the end-of-day component will, as will be discussed below, take this error into account. The specially formatted composite TREX record is also sent in the error case. Manual intervention is necessary to solve the problem. While the TREX format is preferred, other formats may be used.

3. End-of-Day or End-of-Session Component

The end-of-day (or end-of-session) component or "end-of-day processor" 315 is responsible for end-of-day functional processing ensuring that all volume data required is made available to the clearinghouse downstream systems 321.

a. Contract Balancing

During the batch processing the trading system sends contract volume messages via MQSeries 333 to be used in contract balancing. These messages carry up to a defined number of records (in one embodiment ten, but the number can be changed by agreement of all system users) that contain the volume for each actively traded contract. This volume is checked 371 against the corresponding contract volume accumulated by the functional component from the individual trades during the day. Each contract that is verified successfully, i.e., where the volume transmitted from the trading system matches the volume accumulated during the day from the individual trades generated, is passed on to volume enrichment 375. However, if a discrepancy between the volumes is detected, an error message 401 is displayed to the operators 395, further processing for the faulty contract is skipped and the processing continues with the following contracts. Manual procedures are required to resolve the problem.

b. Volume Enrichment

The contract volumes accumulated during the day and the contract volumes received at the end of the day are in trading system format and require enrichment 375. For processing by the clearinghouse downstream systems 321 they are converted to clearing system format and stored in the volume transfer file 405. Most fields can be copied as is. The contract conversion is performed with the process described above under "Trade Enrichment" 365 except for the expiration date conversion. This conversion is not necessary as the expiration date is received in normal YYMMDD format and not necessarily in a proprietary trading system format. From the above description of the embodiments of the present invention, the advantages of the invention are clear. Multiple financial trading systems can be linked to a single clearing system. Multiple kinds of financial instruments can be cleared in a single clearing system, or if desired, more than a single clearing system. In both cases, the invention allows for more rational amounts of collateral and margin. Finally, the more immediate communication of trading information permits more immediate clearing of the transactions, together with attendant resulting benefits, including more appropriate amounts of margin.

The steps of the methods recited herein can be performed in any order consistent with the recited acts. While particular embodiments of the present invention have been and will be shown and described, modifications may be made. In particular, individual mention has been made of specific items of hardware, e.g., mainframe computers, specific forms of software and various kinds of networks. Individual mention has also been made of specific trading systems, clearing systems, types of financial instruments, and trading information. The invention is not limited to the use of these specific components and other specific matters that are exemplary only, but includes all equivalents of those components and matters. For example, the networks described may be private or proprietary, or can include the public Internet. In addition, while certain preferred data formats are described, other data it formats and conversions may also be used.

While the invention has been described with reference to specific embodiments, the description is illustrative of the invention and not to be construed as limiting the invention. Various modifications and applications may occur to those skilled in the art without departing from the true spirit and scope of the invention as defined in the appended claims, including all equivalents.

What is claimed is:

1. A method for generating and transmitting trades to a clearing computer system using a network, the trades comprising fully matching an offer to buy with an offer to sell or partially matching one of an offer to buy or an offer to sell with the other of the offer to buy or the offer to sell, the method comprising:

receiving, at an external trading computer system, an input indicative of a selectable number of trades;

partially matching, at a trading computer system, at least one offer to buy a financial instrument and at least one offer to sell the financial instrument to generate the trade, the partial matching comprising fully matching one of the offer to buy or the offer to sell and partially matching the other of the offer to buy or the offer to sell so that a remainder of the trade is unmatched;

transmitting, from the trading computer system to the external trading computer system, the fully matched one of the offer to buy or the offer to sell separately from the remainder of the trade;

receiving, by the external trading computer system, at least one trade from the trading computer system, the at least one trade received comprising the fully matched one of the offer to buy or the offer to sell;

counting, by the external trading computer system, a number of trades received from the trading computer system;

determining, by the external trading computer system, whether the number of trades equals the selectable number of trades;

sending the at least one trade received, including the fully matched one of the offer to buy or the offer to sell, from the external trading system to the clearing system via the network when it is determined that the selectable number of trades have been received;

matching, at the trading computer system, the remainder of the trade;

transmitting the matched remainder of the trade from the trading computer system to the external trading computer system;

receiving, by the external trading computer system, the matched remainder of the trade; and sending the matched remainder of the trade to the clearing system separately from the fully matched one of the offer to buy or the offer to sell.

2. The method of claim 1, wherein the external trading computer system is configurable for the selectable number of trades.

3. The method of claim 2, wherein the input indicative of the selectable number of trades is based on user input.

4. The method of claim 3, wherein the selectable number of trades is one.

5. The method of claim 3, wherein the selectable number of trades is more than one.

6. The method of claim 1, wherein the trades comprises trades of a plurality of financial instruments.

7. The method of claim 1, wherein the fully matched one of the offer to buy or the offer to sell is sent to the external trading computer system before the remainder of the trade is matched.

8. The method of claim 7, wherein the fully matched one of the offer to buy or the offer to sell is sent to the clearing system before the remainder of the trade is matched.

9. A method for transmitting trades from a trading system to a clearing system using a network, the trades comprising fully matching an offer to buy with an offer to sell or partially matching one of an offer to buy or an offer to sell with the other of the offer to buy or the offer to sell, the method comprising:

partially matching, by a trading system, at least one offer to buy a financial instrument and at least one offer to sell the financial instrument to generate the trade, the partial matching comprising fully matching one of the offer to buy or the offer to sell and partially matching the other of the offer to buy or the offer to sell so that a remainder of the trade is unmatched;

transmitting, from the trading system to an external interface, the fully matched one of the offer to buy or the offer to sell separately from the remainder of the trade;

receiving trades, by the external interface, the trades comprising the fully matched one of the offer to buy or the offer to sell;

determining, by the external interface, whether a selectable number of trades have been received, the selectable number being more than one;

sending, by the external interface, the fully matched one of the offer to buy or the offer to sell to the clearing system via the network when it is determined that the selectable number of trades have been received;

matching, by a trading system, the remainder of the trade;

transmitting the matched remainder of the trade from the trading system to the external interface;

receiving, by the external interface, the matched remainder of the trade; and sending, by the external interface, the matched remainder of the trade to the clearing system separately from the fully matched one of the offer to buy or the offer to sell.

10. The method of claim 9, wherein the trading system comprises a first computer system and the external interface comprises a second computer system.

11. The method of claim 10, further comprising receiving, by the external interface, an input indicative of the selectable number of trades.

12. The method of claim 11, wherein the external interface is configurable for the selectable number of trades.

13. The method of claim 12, wherein the input indicative of the selectable number of trades is based on user input.

14. The method of claim 13, further comprising sending, by the external interface, an end-of-trading-session record indicative of trades in a session of trading.

15. The method of claim 9, wherein the trades comprise trades of a plurality of financial instruments.

16. A method for generating and transmitting trades using a trading generating and transmitting computer system and clearing trades using a clearing computer system using a network, the trades comprising fully matching an offer to buy with an offer to sell or partially matching one of an offer to buy or an offer to sell with the other of the offer to buy or the offer to sell, the method comprising:

partially matching, by a trading generating and transmitting computer system, at least one offer to buy a financial instrument and at least one offer to sell the financial instrument to generate the trade, the partial matching comprising fully matching one of the offer to buy or the offer to sell and partially matching another of the offer to buy or the offer to sell so that a remainder of the trade is unmatched;

transmitting, from the trading generating and transmitting computer system to the clearing computer system, the fully matched one of the offer to buy or the offer to sell;

receiving, by the clearing computer system, the fully matched one of the offer to buy or the offer to sell separately from the remainder of the trade;

storing, by the clearing system, the fully matched one of the offer to buy or the offer to sell separately from the remainder of the trade in a database;

matching, by a trading generating and transmitting computer system, the remainder of the trade;

transmitting, from the trading generating and transmitting computer system to the clearing computer system, the matched remainder of the trade separately from the fully matched one of the offer to buy or the offer to sell;

receiving, by the clearing computer system, the matched remainder of the trade separately from the fully matched one of the offer to buy or the offer to sell; and clearing the fully matched one of the offer to buy or the offer to sell and the remainder of the trade.

17. The method of claim 16, wherein transmitting, to the clearing computer system, the fully matched one of the offer to buy or the offer to sell separately from the remainder of the trade comprises transmitting information regarding other trades between transmitting the fully matched one of the offer to buy or the offer to sell and transmitting separately the remainder of the trade.

18. The method of claim 17, wherein clearing the fully matched one of the offer to buy or the offer to sell and the remainder of the trade comprises using a selection methodology to select trades stored in the database to increase likelihood that the fully matched one of the offer to buy or the offer to sell and the remainder of the trade are cleared simultaneously.

19. The method of claim 17, wherein clearing the fully matched one of the offer to buy or the offer to sell and the remainder of the trade comprises clearing the fully matched one of the offer to buy or the offer to sell separately from the remainder of the trade.

* * * * *

UNITED STATES PATENT AND TRADEMARK OFFICE
CERTIFICATE OF CORRECTION

PATENT NO. : 7,318,045 B2
APPLICATION NO. : 09/793437
DATED : January 8, 2008
INVENTOR(S) : Thomas Baecker et al.

It is certified that error appears in the above-identified patent and that said Letters Patent is hereby corrected as shown below:

On the Title Page 1, item (75), after "Carsten Frank, Ratingen (DE);" insert --Jens Husmann, Frankfurt am Main (DE);--.

On the Title Page 1, item (75), after "Nargolwalla, Schwalbach (DE); insert --Dirk Rüter, Kelkheim (DE);--.

On the Title Page 1, item (73), after "Accenture Global Services GmbH (CH)" and substitute --Accenture GmbH (DE)-- in its place.

In the Claims

Column 22, in claim 6, line 1, after "wherein the trades" delete "comprises" and substitute --comprise-- in its place.

Signed and Sealed this

Fifth Day of August, 2008

JON W. DUDAS
*Director of the United States Patent and Trademark Office*